Feb. 6, 1951   J. P. ARCHEY, JR   2,540,469
ANIMATED DISPLAY DEVICE
Filed Jan. 24, 1949   2 Sheets-Sheet 1
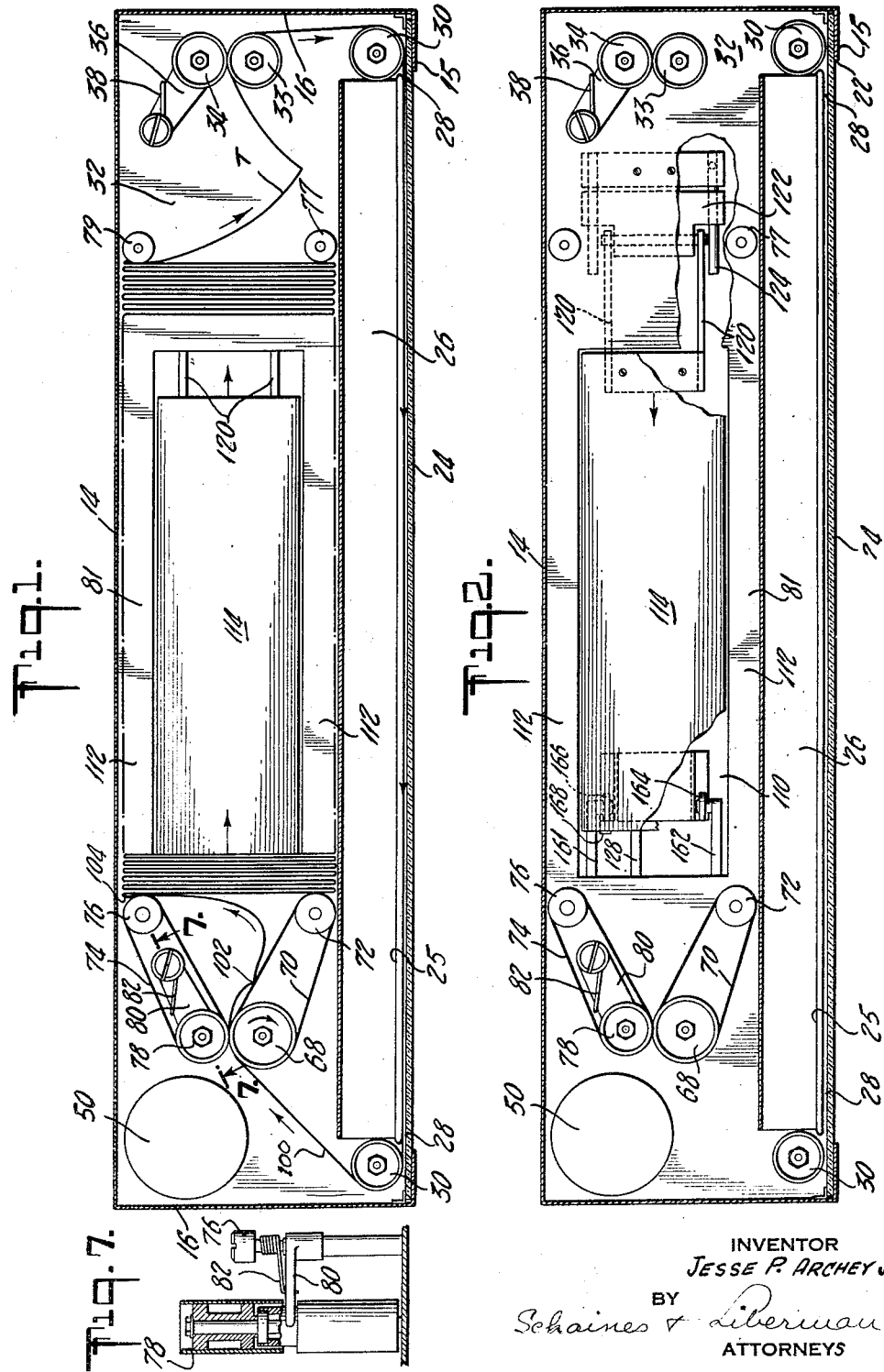
INVENTOR
JESSE P. ARCHEY JR.
BY
Schaines & Lieberman
ATTORNEYS

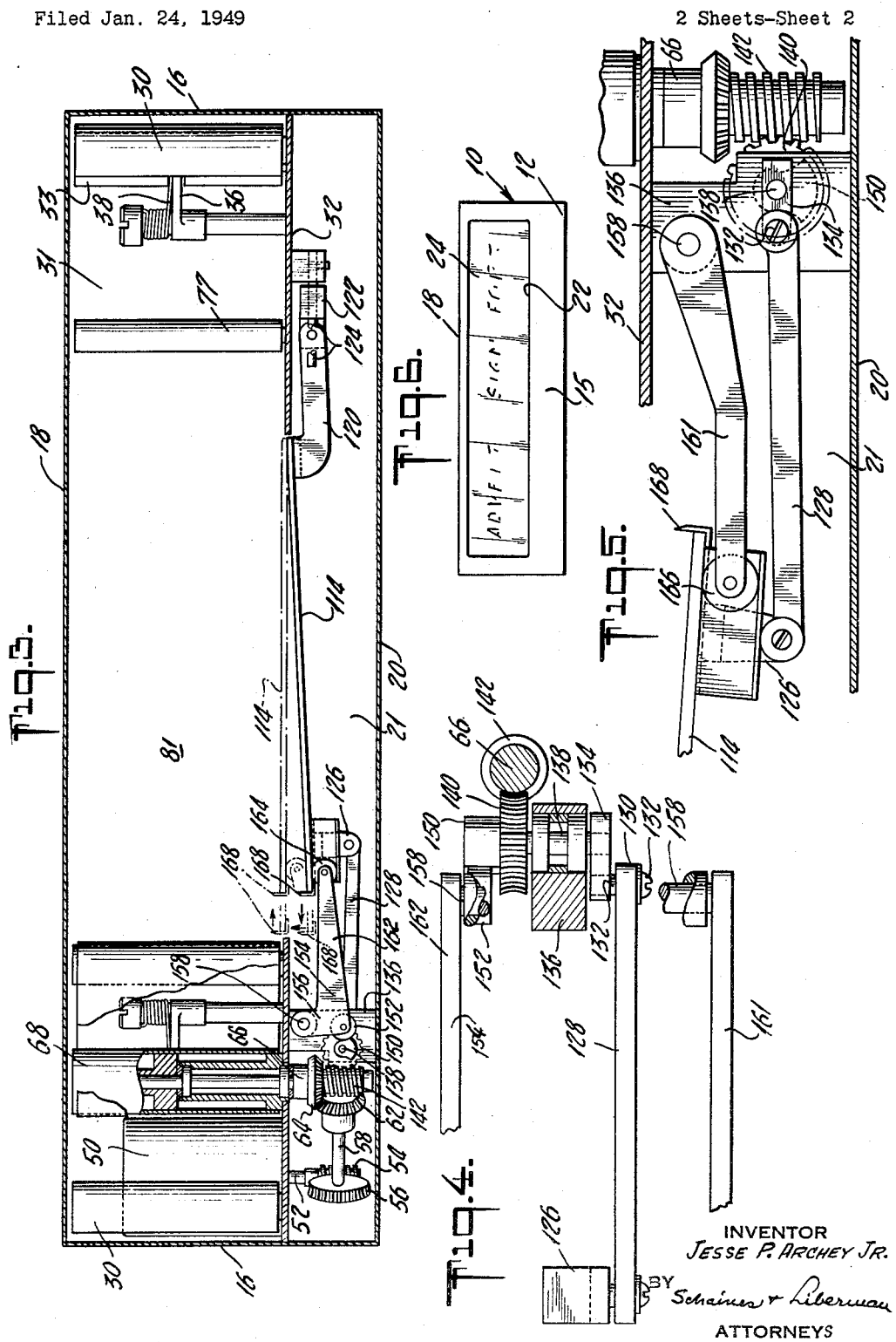

Patented Feb. 6, 1951

2,540,469

UNITED STATES PATENT OFFICE 2,540,469

ANIMATED DISPLAY DEVICE

Jesse P. Archey, Jr., Floral Park, N. Y., assignor to Car Cards, Inc., New York, N. Y., a corporation of New York Application January 24, 1949, Serial No. 72,340

8 Claims. (Cl. 40—32)

The present invention relates generally to the field of display devices. In particular, the present invention relates to animated display devices of the type wherein an elongated endless band or tape, with display material thereon, is moved past a window through which the display material can be seen.

In devices of this general type, an elongated endless band or tape is utilized in order to provide an increased amount of display material. The extra length, however, creates a problem in the handling, storing and movement thereof to and from the viewing position. In these devices, the desiderata is the smooth, even and uninterrupted movement of the tape across the viewing window, for this reason, and others, the moving mechanism is usually disposed at the exit end of the window. Normally, a single motive mechanism is provided for the tape. Two drive mechanisms create an additional problem of synchronization, etc. The most important problem in display devices of this type is created by the bunching or gathering of the slack portion of the endless tape immediately after passage past the viewing window, and it is the solution of this particular problem to which the present invention is directed.

It is to be understood that in devices of the general type with which this invention is concerned, there is provided a casing having a viewing window in the front thereof, band or tape driving means at the exit side of the window, and a storage chamber in the rear where the slack of the tape is disposed after passage across the viewing window and prior to its movement toward the viewing window.

A broad general object of the present invention is the provision in a device of the character described of means to insure smooth, even and continuous movement of the tape past the viewing window.

The main specific object of the present invention is the provision of a mechanism, in a device of the character described, to shift a portion of the slack in the endless belt towards the entrance to the viewing window periodically and in timed relation to the tape movement, in order to prevent the formation of a drag on the tape or band driving mechanism, and in order to prevent any crowding of the tape storage space.

Another object of the present invention is the provision, in a device of the character described, of means to move the tape or band continuously, associated with means operable from the same motive source to shift a portion of the stack of slack away from the entrance to the storage chamber towards the exit from the storage chamber.

Still another object of the present invention is the provision, in a device of the character described, of a platform within the tape storage chamber, which platform is laterally reciprocable to shift a portion of the tape slack away from the tape moving means and towards the viewing window.

Still another object of the present invention is the provision, in a device of the character described, of a tape supporting platform which is laterally and reciprocably raisable and shiftable to lift a portion of the tape slack and shift same away from the driving mechanism and towards the viewing window.

Other and further objects of the invention will in part be obvious, and still others will be specifically pointed out in connection with the following description of an illustrative embodiment of the present invention.

In the drawings annexed hereto and forming a part hereof,

Figure 1 is a top plan view of one form of device constructed according to and embodying the present invention, with the casing cover removed, and illustrating the tape in position in the device;

Figure 2 is a similar view but with the tape removed, and with portions of the inner floor of the casing broken away;

Figure 3 is a front elevational view of the device, with the front wall of the casing removed to illustrate details of the tape and platform actuating mechanism, partly in section;

Figure 4 is a plan view, partly in section, of the platform lifting and shifting mechanism;

Figure 5 is an enlarged side elevational view, seen from the rear, of the platform lifting and shifting mechanism in retracted position;

Figure 6 is a front elevational view of the encased assembly as a unit; and

Figure 7 is a section on the line 7—7 of Figure 1.

The device of my invention is indicated by reference numeral 10 and comprises a generally rectangular casing 12, having a rear wall 14, front wall 15, end walls 16, 16, cover 18 and floor 20. Casing 12 may be formed of thin section metal, wood, plywood or similar material as desired of sufficient strength and rigidity to support the operating elements to be described hereinbelow. Front wall 15 is apertured to provide an elongated rectangular window 22 extending lengthwise across the face of the casing. A sheet 24 of glass or the like may be mounted in front of window 22, as desired, and a second sheet 25 of glass or the like may be mounted behind the window, spaced from sheet 24. Immediately behind window 22, I may mount a source of illumination as an elongated fluorescent tube 26.

It is to be understood that a series of individual electric light bulbs may be disposed within casing 10, behind window 22, extending across the width thereof, it being desired to provide uniform distribution of illumination across the window's with. It is to be further understood that within the scope of the present invention, the tape or band may be perforated so as to permit light to shine therethrough; that the tape may be translucent with opaque display material thereon; or that the tape may be opaque with phosphorescent or otherwise glowing display material on the face thereof. In the latter case, no light as 26 need be provided.

An inner floor plate 32 is provided, spaced upwardly of casing floor 20, dividing the casing horizontally and lengthwise into an upper chamber 31 and a lower chamber 21 (see Figure 3). A tape passageway or trackway 28 is provided between sheets 24, 25, of such width as to permit the tape to pass freely therebetween. As seen in Figures 1, 2 and 3, a pair of vertically extending idler guide rollers 30, 30 are mounted atop inner floor 32, adjacent the entrance and exit ends of passageway 28, at the front of chamber 31. A pair of idler guide rollers 33, 34 are disposed atop floor 32 at the rear of chamber 31 in line with the idler guide roller 30 adjacent the entrance to passageway 28. The shaft on which roller 33 is mounted is fixedly secured to floor 32, while roller 34 is mounted on a swinging bracket arm 36 which is normally urged by spring 38 into engagement with roller 33.

At the tape exit side of chamber 32, I dispose a motor 50 having a rotating shaft 52 extending vertically downward through floor 32 into the lower chamber 21, shaft 52 having a spiral worm gear 54 at the end thereof in mesh with a gear wheel 56 at one end of a short horizontally disposed drive shaft 58, the other end of which shaft 58 has a vertically arranged miter gear 62 which is in mesh with a horizontally arranged miter gear 64 on a drive roll shaft 66 which extends upward into chamber 32 and has vertically arranged drive roller 68 mounted thereabout, the direction of rotation of roller 68 being clockwise (see Figure 1.) As will be readily understood, the rate of rotation of shaft 66 can be varied by the gear ratios between gear wheel 56 and spiral worm gear 54.

An endless throat belt 70 is threaded about drive roller 68 and an idler roller 72 disposed vertically inwardly of the upper chamber. A second endless throat belt 74 is wound about a fixed idler roller 76 and an idler roller 78 which is mounted on a bracket arm 80 and urged by spring 82 against drive roller 68. It is to be noted that idlers 72 and 76 are in alignment, and define the inner end of the storage area 81 for the tape or ribbon slack. A pair of aligned idler rollers 77, 79 are provided to serve as a stop, which rollers 77, 79 are spaced inwardly of rollers 33, 34, to define the outer end of the storage area 81. The storage area between idlers 72, 76 on one side and idlers 77, 79 on the other, is rectangular in outline.

The elongated endless belt, or tape bearing the advertising display material thereon is indicated by reference numeral 100, and may be formed of cloth, paper, plastic or the like. As seen in Figure 1, tape 100 is preferably folded or pleated, as indicated at 102, 104, each pleat being made in the opposite direction to the preceding pleat. Thus, as tape T is pulled out of the exit end of track 28, around roller 30, and urged through throat belts 70, 74, towards the interior of the storage chamber 81, the successive folds 102, 104, will cause the tape to arrange itself as seen in Figure 1, with the tape folds lying flatly against each other. The distance between folds 102, 104, etc, must of necessity be less than the width of chamber 81 from front to back thereof.

As seen best in Figure 1, 2 and 3, chamber 81 is defined by idlers 72, 76 and 77, 79, by floor 32, and cover 18. Floor 32 within chamber 81 is centrally apertured lengthwise thereof, as at 110, leaving rail supports 112, 112 at the front and back thereof. A platform 114 is provided, with means to reciprocably shift same to be detailed below.

As tape 100 is drawn across window 22, and urged into storage chamber 81, the successive folds build up in number and gradually start exerting a rearward pressure against the throat belts 70, 74 which causes jamming. A forward pressure would be desirable to relieve any tension on tape T at the exit end from chamber 81, past the stop rollers 77, 79, through idlers 33, 34 and around guide roller 30. However, once tape T is moved forwardly past drive roller 68 and into storage chamber 81, the only active force on it comes from drive 68 around the circuit through idlers 30, 30, thence 33, 34, past idlers 77, 79 and back along the entire length of tape. Inertia is built up at the rear of the stack which puts a sizeable amount of tension on the tape and results in jerky, uneven movement of the tape out of the storage area. It is the relief of this tension that is accomplished by my shiftable platform 114.

Platform 114 is supported at both ends thereof. At the delivery end of chamber 81, platform 114 is provided with a pair of downwardly and forwardly extending arms 120, 120 at each side thereof, which arms are pivotally secured to a sliding block 122, which rides on slide rods 124, 124 threaded horizontally through block 122, as seen in Figures 2 and 3. At the opposite end of platform 114, adjacent the entrance to chamber 81, platform 114 is provided with a downwardly extended arm 126 to which one end of a connecting rod 128 is pivotally secured.

The other end 130 of connecting rod 128 is pivotally held, by a pin 132, to an end of a crank rod 134, the other end of which crank 134 is fixed on a shaft 138 for rotation therewith. Shaft 138 extends transversely and horizontally through a support bearing block 136 between base 20 and floor 32. A take-off worm gear 140 is mounted on shaft 138, on the other side of block 136, for rotation with shaft 136, gear 140 meshing with drive worm gear 142 on the lower reach of drive shaft 66.

Thus, as shaft 66 and gear 142 are rotated on their vertical axis, through take-off worm gear 140 this is translated to rotation of horizontally disposed shaft 138, and connecting rod crank 134 into back and forth reciprocating movement of rod 128 and of platform 114 along with it, see Figures 4 and 5.

Referring now to Figure 3, a cam segment 150 is fixed on shaft 138 for rotation therewith, bearing against a cam follower roller 152 mounted at the angle of a right angled lever 154. The shorter arm 156 of lever 154 extends upwardly and the end thereof is fixed onto one end of a shaft 158 mounted transversely through block 136, which shaft has fixed onto its other end an arm 161. The longer arm 162 of lever 154 extends forwardly and has a lift arm roller 164 mounted at its terminal, and the terminal of arm 161 similarly has a lift roller 166 mounted thereon, on the same horizontal level as lift roller 164.

As shaft 138 is rotated, cam segment 150 bears against and raises cam follower roller 152, causing a pivoting of lever 154 and rotation of shaft 158, and along with it arms 161, 162, and along with them rollers 164, 166, thereby raising platform 114 to the dotted line position of Figure 3, at which time, the forward shift is imparted to platform 114 by crank rod 128. Thus, platform 114 is caused to shift upwardly and then forwardly. Platform 114, at the end thereof adjacent the entrance to storage chamber 81, is provided with an upstanding lip 168. As it is raised to the dotted line position, lip 168 passes between the folds of the stacked tape, and in its forward movement carries the stack away from the entrance to chamber 81 towards the delivery end.

With this mechanism, while the tape is being moved continuously past the viewing window, the tape slack in the storage area 81 is intermittently shifted towards the exit end thereof. This movement accomplishes two results. First, it eliminates all back pressure on the driving mechanism throat belts and prevents jamming or crowding therebetween. Second, it eliminates any undue load on the tape moving means at rollers 33, 34, guides 38, 38, etc. and insures smooth, even, uninterrupted movement of the tape across the viewing window. The use of throat belts 70, 74 in combination with the pleated tape, insures the proper stacking of the tape in folds in the storage area since the tape will swing against one or the other of belts 70, 74 according to the direction of the fold lines, and be carried thereby past one or the other of rollers 76, 72.

Ordinarily, the stacked tape slack will rest on rails 112, 112, but the rearward portion of the stack will be engaged intermittently by platform 114 and lip 168, and shifted towards the exit from chamber 81. It is to be noted that the upward extension of lip 168 renders it unnecessary to lift platform 114 appreciably above the level of floor 32.

Having now described my invention, what I claim and desire to secure by Letters Patent is:

1. In a device of the character described including a vertically arranged viewing window, a horizontally extending support behind the window, a part of which support comprises a reciprocably shiftable platform, means to reciprocably shift said platform, an elongated endless strip having a plurality of transverse pleat lines uniformly spaced apart and successively in opposite directions whereby a portion of the strip remote from the viewing window may be folded on itself with the folds lying flatly against one another, and stacked atop the support means for continuously drawing said strip past the viewing window including a pair of cooperating rollers adjacent one end of the window, said means continuously folding the strip on itself past the rollers, and stacking same atop the support, movement of the horizontally reciprocable platform shifting a portion of the stack intermittently away from the said one end of the support towards the other end.

2. In a device of the character described including a vertically arranged viewing window, a horizontally extending support behind the window, a part of which support comprises a reciprocably shiftable platform, means to reciprocably shift said platform, an elongated endless strip having a plurality of transverse pleat lines uniformly spaced apart and successively in opposite directions whereby a portion of the strip remote from the viewing window may be folded on itself with the folds lying flatly against one another and stacked atop the support, continuously operative motor means for continuously drawing said strip past the viewing window including a pair of cooperating rollers adjacent one end of the window, said means continuously folding the strip on itself past the rollers, and stacking same atop the support, shifting of the horizontally reciprocable intermittently operative platform moving a portion of the stack intermittently away from the said one end of the support towards the other end.

3. In a device of the character described including a vertically arranged viewing window, a horizontally extending support behind the window, a part of which support comprises a reciprocably shiftable platform, motor means to reciprocably shift said platform, an elongated endless strip having a plurality of transverse fold lines spaced uniformly therealong, successive fold lines being in opposite directions whereby a portion of the strip may be folded on itself in zig-zag manner, motor means for drawing a portion of said strip past said viewing window, said means including a pair of cooperating rollers adjacent one end of said viewing window, said rollers cooperating in folding the viewed portion of the strip and stacking same upon the support, the horizontally reciprocating platform operating intermittently in response to its motor control to shift a portion of the stack from the one end of the support towards the opposite end thereof.

4. A device as in claim 3, in which the platform shifting means raise the platform above the level of the support in the advancing phase of its movement, and depress the platform below the level of the support during the return phase of its movement.

5. A device as in claim 3 in which the horizontally reciprocating platform is motor shifted intermittently while the rollers operate continuously.

6. A device as in claim 3 in which the horizontally reciprocating platform operates is motor shifted intermittently and is raised above the level of the support during the stack shifting phase of its movement.

7. A device of the character described comprising a casing having a viewing window therein, an elongated endless strip of material disposed within the casing, a portion of which strip is viewable through the window, a storage chamber within the casing and behind the window, the chamber including a strip supporting floor a portion of which floor comprises a platform which is horizontally and reciprocably shiftable lengthwise of the chamber, continuously operable motor means to move the tape past the viewing window and into the storage chamber, and atop the support, and means associated with the motor intermittently operable to reciprocably shift the platform portion of the support to move the tape within the chamber from the entrance end thereinto towards the opposite end thereof.

8. A display device comprising a casing having a viewing window in the front thereof, and a storage chamber in the rear thereof, an endless, elongated strip of material having display indicia thereon for viewing through the window, motor means under the casing for moving one portion of the strip across the viewing window from one end thereof to the other while disposing the remainder of the strip in the storage chamber in zig-zag arrangement, a floor within the casing for supporting the tape inside the storage chamber, a portion of which floor is reciprocably shiftable lengthwise of the chamber for moving the strip portion therewithin from one end of the chamber to the other adjacent the entrance to the viewing window, and means associated with the motor to reciprocably shift the floor portion.

JESSE P. ARCHEY, Jr.

REFERENCES CITED

The following references are of record in the file of this patent:

UNITED STATES PATENTS

| Number | Name | Date |
| --- | --- | --- |
| 1,729,323 | Barker | Sept. 24, 1929 |

FOREIGN PATENTS

| Number | Name | Date |
| --- | --- | --- |
| 693,695 | France | Sept. 1, 1930 |